(No Model.)
W. J. MENZIES.
EVAPORATION OF SALT BRINE OR OTHER LIQUIDS.
No. 307,316. Patented Oct. 28, 1884.
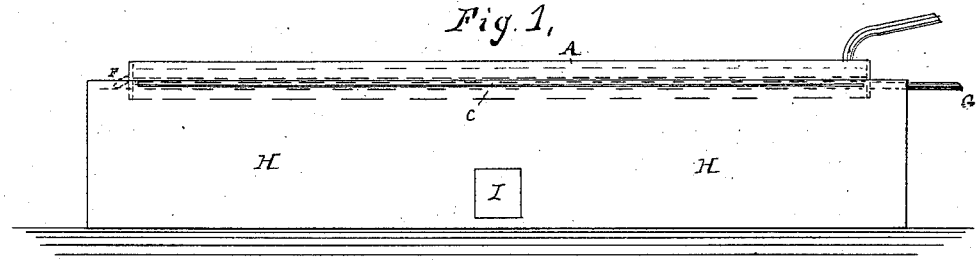
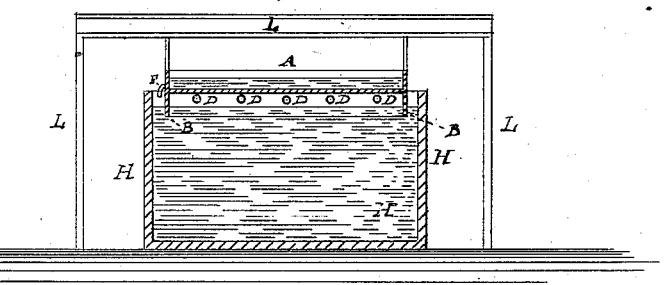
WITNESSES:
INVENTOR
BY
ATTORNEY

UNITED STATES PATENT OFFICE.

WILLIAM J. MENZIES, OF ST. HELEN'S, COUNTY OF LANCASTER, ENGLAND.

EVAPORATION OF SALT BRINE OR OTHER LIQUIDS.

SPECIFICATION forming part of Letters Patent No. 307,316, dated October 28, 1884.

Application filed September 29, 1884. (No model.)

*To all whom it may concern:*

Be it known that I, WILLIAM J. MENZIES, a citizen of England, and a resident of St. Helen's, county of Lancaster, England, have made certain new and useful Improvements in the Evaporation of Salt Brine or other Liquids, of which the following is a specification.

Hitherto the evaporation of brine for the production of salt has been generally carried on in iron vessels heated externally by flues passing underneath them, or with steam-pipes passing through them. As the salt produced by the evaporation and consequent concentration of the salt brine is precipitated, it falls to the bottom of the iron vessels and has to be fished out, requiring considerable labor for the purpose. It also forms a scale or crust on the surface of the iron vessel exposed to the fire or steam-pipes employed in evaporation, which necessitates further considerable labor to remove it by chipping off. There is also much wear and tear on the evaporating-pan and waste of salt by forming salt scale, which is not a marketable product. It has also been proposed to evaporate brine by direct application of the heat over the surface of the liquid in pans covered either with an arch or with another pan placed above it; but this method has not produced a clean marketable product, owing to imperfect combustion of the fuel causing a smoky fire, besides small particles of unconsumed fuel being mechanically carried over by the draft necessary for combustion. These particles get mixed and go down with the salt obtained, thus discoloring it and making it unfit for sale. There is also considerable difficulty in protecting the edge of the lower pan next the fire from being burned away by the action of the flame, it being impossible to protect and keep it cool by keeping it in contact with the liquor right up to the extreme upper end. Now, I have discovered that all these difficulties can be obviated, first, by the use of "natural gas"—a product now largely obtained in Pennsylvania, Virginia, and other places, and generally where salt brine is also obtainable. This gas consists of a mixture of hydrogen and "marsh-gas," therefore containing very little carbon. Consequently a perfectly clear flame can easily be obtained without admixture of unoxidized carbon or giving solid particles of fuel, which are mechanically carried over, as in the case of coal. Secondly, the labor of fishing out the salt can be entirely avoided by the use of my apparatus, besides the formation of any salt scale.

Instead of natural gas, an artificial gas having the properties of natural gas may be used.

My method of proceeding is as follows: I construct a large reservoir of wood, stone, iron, or other suitable material, of considerable depth—say twelve (12) feet broad, eighty feet long, and ten feet deep. In the upper portion of this reservoir I suspend a shallow iron pan of rather smaller dimensions—say ten feet broad by seventy-eight feet long by one foot deep, having sides carried down about one foot below the bottom of the pan, which are either of iron or fire-tiles bolted on. I so suspend this pan that when the reservoir is nearly filled with brine the liquid will come above the lower sides of the suspended pan, but leave a space of four to six inches between the bottom of the upper pan and the surface of the brine. Near one end of the pan I fix gas-jet burners in air-pipes placed a short distance from the end of the pan, so as to insure combustion of the gas before entering the space between the suspended pan and the surface of the brine in the reservoir. I fill the suspended pan with weak brine, and keep a constant stream running into it at one end and an equivalent stream running out of it at the other end, emptying into the reservoir below. In this manner the brine is heated and partially concentrated in the upper suspended pan, and then empties itself into the lower reservoir. The action of the flame on the surface of the partially-concentrated brine in the lower reservoir is to form solid salt, which immediately is removed by its weight from the surface of the brine and falls to the bottom of the reservoir. In this way the boiling is continued for some days or weeks, depending upon the size of the lower reservoir, until it is nearly filled with salt. The gas is then turned off, the remaining liquid, which will consist of bottom water, run off, and the salt allowed to drain. It is then simply dug out and loaded into wagons.

In the drawings, Figure 1 is a side view of my improved apparatus, and Fig. 2 is a cross-section.

A is the suspended pan in the reservoir H, with sides and ends B B extending below the surface of the brine in the reservoir; C, the space between the bottom of the pan A and the surface of the brine on the reservoir H, through which the flame passes. D D D D are the gas-burners in air-pipes; G, the exit-flues from space c c c; E, the brine-feeding pipe; F, the brine-delivery pipe from the upper pan; I, the door in the reservoir H for removing the salt when the evaporation is suspended; K, the coil-pipe from the reservoir for running away the water; 4 4 4, the girders or other suitable device for suspending the pan A.

I have described my invention as applied to the manufacture of salt, to which it is specially important; but it may be used also for condensing liquid of any kind.

Having thus described my invention, what I claim, and desire to secure by Letters Patent of the United States, is—

1. The use of natural gas or the described equivalents for the surface evaporation of salt brine or other liquid by direct application of flame, as described.

2. The process described of evaporating brines and other liquids, consisting in surface evaporation by means of the products from the burning of natural gas or other similar gas, which will produce products of combustion free from smoke, soot, ashes, ethers, tars, or other offensive substances, as set forth.

3. The apparatus for the evaporation of salt brine or other saline liquids, consisting of a deep lower pan and a suspended pan with projecting flanges, as described, so as to form a closed space between the upper and lower pan for products of combustion when the upper and lower pans are charged with brine, as set forth.

4. The apparatus for concentrating brines and other liquid, consisting of the lower pan, H, the upper pan, A, having flanges B, and jet-burners D, all combined and arranged substantially as described and set forth.

In witness whereof I have hereunto set my hand.

WILLIAM J. MENZIES.

Witnesses:
GEO. H. SONNEBORN,
O. B. MORRIS.